United States Patent [19]

Ogura et al.

[11] Patent Number: 5,915,822
[45] Date of Patent: Jun. 29, 1999

[54] METER WITH LIGHT TRANSMITTING BOARD

[75] Inventors: Akihiro Ogura; Masanori Tone, both of Saitama; Kazuo Arai, Yokohama; Tetsuhide Takeyama; Toshitaka Higuchi, both of Tokyo, all of Japan

[73] Assignee: Kansei Corporation, Omiya, Japan

[21] Appl. No.: 08/908,711

[22] Filed: Aug. 8, 1997

[30] Foreign Application Priority Data

Aug. 9, 1996 [JP] Japan .................................... 8-210839
Aug. 9, 1996 [JP] Japan .................................... 8-210840

[51] Int. Cl.⁶ .................................................. G01D 11/28
[52] U.S. Cl. ............................... 362/26; 362/23; 362/29; 362/31; 362/489; 385/146; 385/901
[58] Field of Search .................................. 362/23, 26, 28, 362/29, 31, 489, 488, 487; 73/499; 116/250; 385/146, 901

[56] References Cited

U.S. PATENT DOCUMENTS

| 4,323,951 | 4/1982 | Pasco ........................................ 362/27 |
| 4,975,807 | 12/1990 | Ohashi ..................................... 362/23 |
| 5,790,322 | 8/1998 | Kameda ................................... 359/742 |

FOREIGN PATENT DOCUMENTS 53-2065  1/1978  Japan .

*Primary Examiner*—Thomas M. Sember
*Assistant Examiner*—Marshall Honeyman
*Attorney, Agent, or Firm*—Foley & Lardner

[57] ABSTRACT

A transmitted illumination type meter comprises a transparent light transmitting board having both a light entering bore and a shaft passing bore formed therethrough; a translucent dial plate placed on a front surface of the board, the dial plate having a shaft passing opening mated with the shaft passing bore of the board; a movement positioned behind the board; a light source positioned within the light entering bore; a drive shaft extending from the movement to the outside of the dial plate through the shaft passing bore and the shaft passing opening; a transparent pointer connected to the drive shaft to move over a front surface of the dial plate; and an annular convex peripheral wall defining the light entering bore. The annular convex peripheral wall allows light beams from the light source to enter the board and travel in parallel in the same. A plurality of stepped annular light reflecting surfaces are formed on a rear surface of the board and arranged to be concentric with the light entering bore. The annular light reflecting surfaces reflect the light beams from the annular convex peripheral wall toward the front surface of the light transmitting board. A Fresnel lens is formed on the front surface of the board and arranged to be concentric with the light entering bore. The Fresnel lens projects the light beams from the annular light reflecting surfaces toward the dial plate.

18 Claims, 7 Drawing Sheets

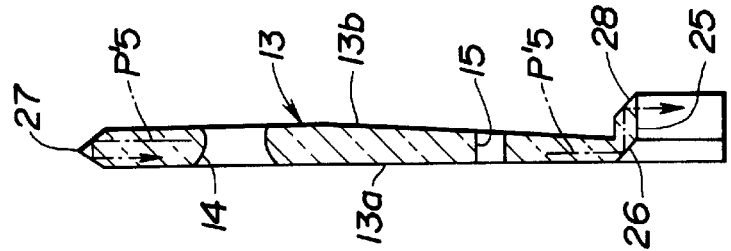
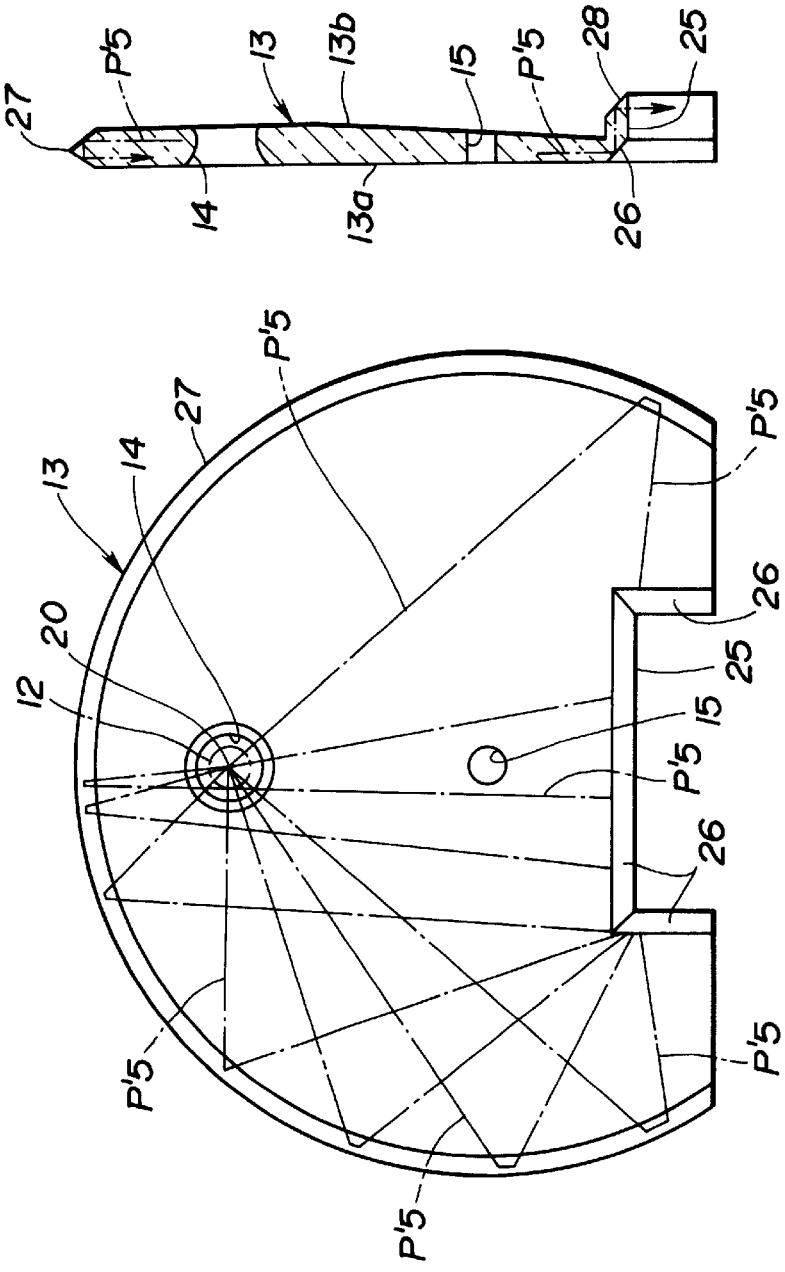
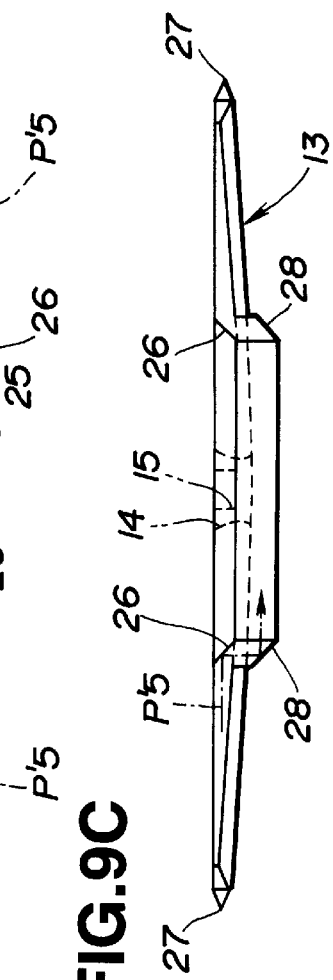

METER WITH LIGHT TRANSMITTING BOARD

BACKGROUND OF THE INVENTION

1. Field of the Invention

The present invention relates in general to meters, and more particularly to meters of a transmitted illumination type which comprises a transparent board, a dial plate laid on the board, a transparent pointer moving over the dial plate and a light source for illuminating the dial plate from back and the pointer from within, by using the board as a light transmitting means.

2. Description of the Prior Art

In order to clarify the task of the present invention, one conventional meter of the above-mentioned type will be briefly described with reference to FIG. 10 of the accompanying drawings. The conventional meter is described in Japanese Patent Second Provisional Publication 53-2065.

In the drawing, denoted by numerals 1, 2, 3 and 4 are a housing, a movement, a translucent dial plate and a transparent pointer respectively. Denoted by numerals 5 and 6 are electric bulbs and denoted by numerals 7 and 8 are transparent light transmitting boards. Denoted by numeral 9 is a drive shaft extending from the movement 2 to the pointer 4. As is indicated by the arrow "P1", one part of light beams emitted from the electric bulbs 5 and 6 travels in the light transmitting boards 7 and 8 and reached to the pointer 4 to illuminate the same from within. Other part of the light beams from the bulbs 5 and 6 illuminates directly a back surface of the translucent dial plate 3 as is indicated by the arrow "P2" and illuminates the back surface of the dial plate 3 after being reflected by an inner wall of the housing 1 as is indicated by the arrow "P3". A ruled half-tone screen 35 is printed on a front surface of the dial plate 3. That is, in the dial plate 3, areas near the electric bulbs 5 and 6 are printed with condensed black dots to effect a greater light stopping and areas remote from the bulbs 5 and 6a are printed with scattered black dots to effect a smaller light stopping. With this ruled half-tone screen 3S, the dial plate 3 is evenly illuminated therethroughout.

However, printing the ruled half-tone screen onto the dial plate 3 needs a skilled, time-consuming and troublesome work and thus causes increase in cost of the meter. In fact, it is very difficult to apply even printing on various types of dial plates.

SUMMARY OF THE INVENTION

It is therefore an object of the present invention to provide a transmitted illumination type meter, whose dial plate can be evenly illuminated therethroughout without usage of the ruled half-tone screen.

It is another object of the present invention to provide an illumination type meter whose thickness is relatively small.

It is still another object of the present invention to provide an illumination type meter which can be produced at a low cost.

It is a further object of the present invention to provide a flat type light transmitting board which is suitable for production of a flat illumination type meter.

According to a first aspect of the present invention, there is provided a meter which comprises a transparent light transmitting board having both a light entering bore and a shaft passing bore formed therethrough; a translucent dial plate placed on a front surface of the light transmitting board, the dial plate having a shaft passing opening mated with the shaft passing bore of the light transmitting board; a movement positioned behind the light transmitting board; a light source positioned within the light entering bore; a drive shaft extending from the movement to the outside of the dial plate through the shaft passing bore and the shaft passing opening; a transparent pointer connected to the drive shaft to move over a front surface of the dial plate; an annular convex peripheral wall defining the light entering bore, the annular convex peripheral wall allowing light beams from the light source to enter the light transmitting board and travel in parallel in the same; a plurality of stepped annular light reflecting surfaces formed on a rear surface of the light transmitting board and arranged to be concentric with the light entering bore, the annular light reflecting surfaces reflecting the light beams from the annular convex peripheral wall toward the front surface of the light transmitting board; and a Fresnel lens formed on the front surface of the light transmitting board and arranged to be concentric with the light entering bore, the Fresnel lens projecting the light beams from the annular light reflecting surfaces toward the dial plate.

According to a second aspect of the present invention, there is provided a light transmitting board for use in an illumination type meter. The light transmitting board comprises a flat transparent board; a light entering bore formed in the transparent board, the light entering bore being defined by an annular convex peripheral wall of the transparent board, the light entering bore being adapted to receive therein a light source for allowing light beams from the light source to enter the transparent board and travel in parallel therein; a plurality of stepped annular light reflecting surface formed on a rear surface of the transparent board and arranged to be concentric with the light entering bore, the annular light reflecting surfaces reflecting the light beams from the light entering bore toward a front surface of the transparent board; and a Fresnel lens formed on the front surface of the transparent board and arranged to be concentric with the light entering bore, the Fresnel lens projecting the light beams from the stepped annular light reflecting surfaces toward the front of the transparent board.

BRIEF DESCRIPTION OF THE DRAWINGS

Other objects and advantages of the present invention will become apparent from the following description when taken in conjunction with the accompanying drawings, in which:

FIG. 3 is a sectional view taken front a direction opposite to the direction from which FIG. 1 is taken, showing a positional relation between the flat type light transmitting board and a liquid crystal display panel;

FIGS. 5A and 5B are illustrations for explaining operation of the flat type light transmitting board, in which FIG. 5A is an enlarged view of the part enclosed by a circle indicated by reference "VA" in FIG. 5B;

FIGS. 9A, 9B and 9C are respectively plan, vertically sectional and bottom views of the flat type light transmitting board, showing light traveling paths.

DETAILED DESCRIPTION OF THE INVENTION

Figure 1:
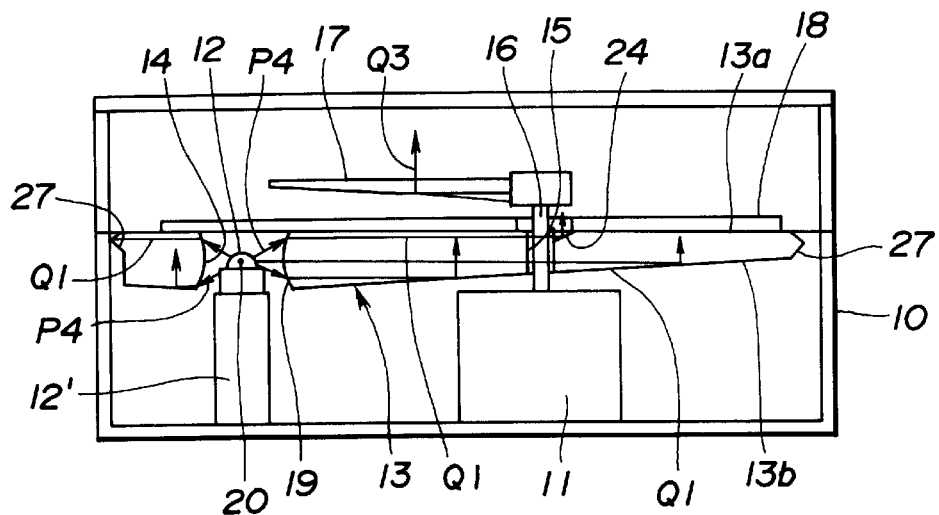
FIG. 1 is a sectional view of an illumination type meter according to the present invention.
Figure 2:
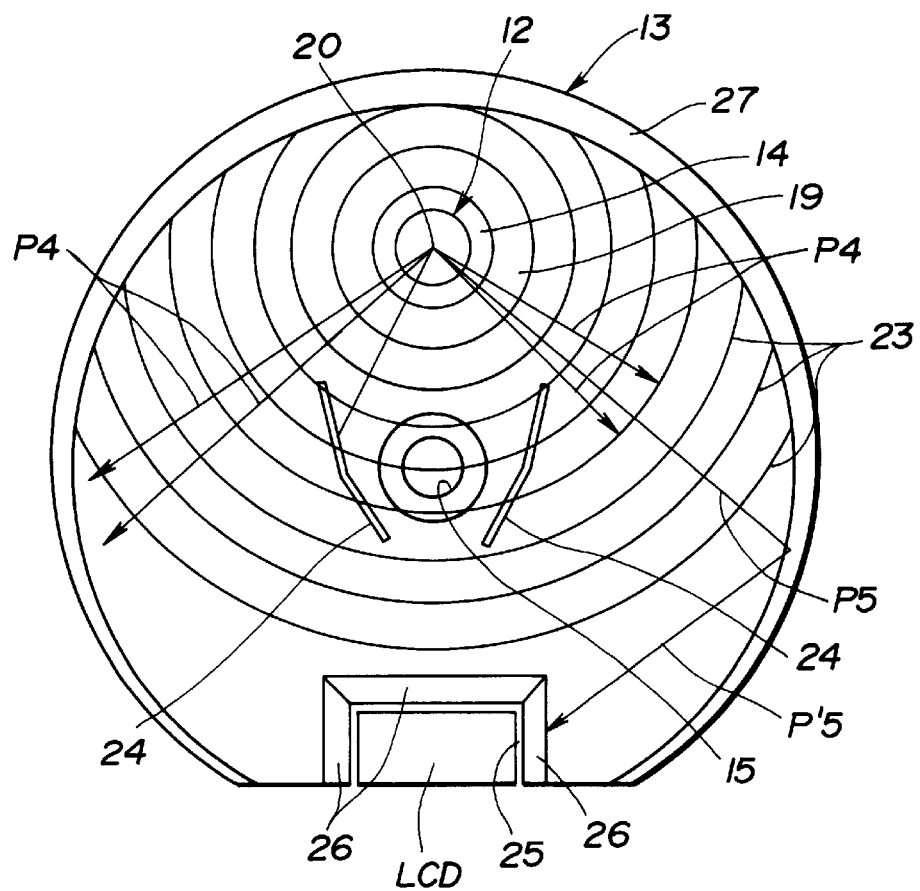
FIG. 2 is a plan view of a flat type light transmitting board used in the meter of the invention.
Figure 3:
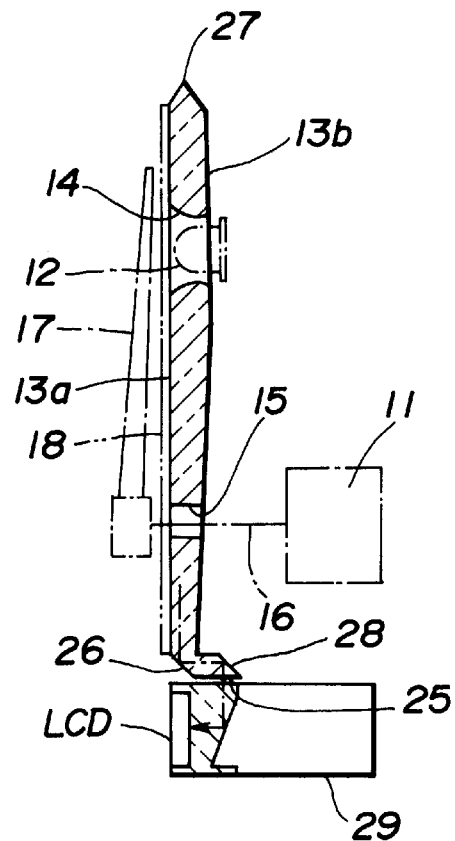

Referring to FIGS. 1 to 3, particularly FIG. 1, there is shown an illumination type meter according to the present invention.

In FIG. 1, the meter comprises a housing 10. Within the housing 10, there are installed a movement 11, an electric bulb 12 and a flat light transmitting board 13. The movement 11 is disposed on a back wall of the housing 10, and the electric bulb 12 is detachably disposed on a bulb holder 12' extending from the back wall. Although not shown in the drawing, a known holder structure is employed for tightly holding the flat light transmitting board 13 in the housing 10 in such a manner that the board 13 extends over the back wall leaving a certain space defined therebetween. The board 13 is constructed of a transparent plastic or the like. The board 13 has both a light entering bore 14 in which the electric bulb 12 is arranged and a shaft passing bore 15 through which a drive shaft 16 of the movement 11 projects to a front side of the board 13.

As is seen from FIG. 2, the flat light transmitting board 13 is circular in shape. The shaft passing bore 15 is placed at a center portion of the circular board 13, while, the light entering bore 14 is placed at an eccentric portion of the board 13.

Referring back to FIG. 1, a transparent pointer 17 is fixed at a base portion thereof to the projected end of the drive shaft 16. For the reason which will become apparent hereinafter, the base portion of the pointer 17 is formed with a light reflecting surface (not shown). A dial plate 18 of translucent material (or transparent material) is placed on a front surface 13a of the board 13 in a manner to cover the light entering bore 14 of the board 13. The dial plate 18 has a graduation and indication marks printed on a front surface thereof. That is, on the entire of the front surface of the dial plate 18, there is coated a transparent white paint, and an opaque paint is coated on the white-painted front surface except portions which constitute the graduation and the indication marks. Accordingly, when the dial board 18 is illuminated from the back, only illumination of the graduation and indication marks is viewed from the front of the dial board 18.

As shown, the dial plate 18 has an opening (no numeral) mated with the shaft passing bore 15 of the board 13, through which the drive shaft 16 of the movement 11 passes.

As is seen from FIGS. 1 and 2, the light entering bore 14 of the circular light transmitting board 13 is bounded by an annular convex peripheral wall 19 through which light beams "P4" from the electric bulb 12 enter the board 13. Designated by numeral 20 is a filament of the electric bulb 12. The peripheral wall 19 of the light entering bore 14 may take any shape so long as the same can effectively receive the light beams "P4" from the bulb 12. Due to a refraction function of the peripheral wall 19 of the light entering bore 14, the light beams "P4" entering the board 13 are forced to travel therein in parallel as indicated by arrows "Q1".

Figure 4:
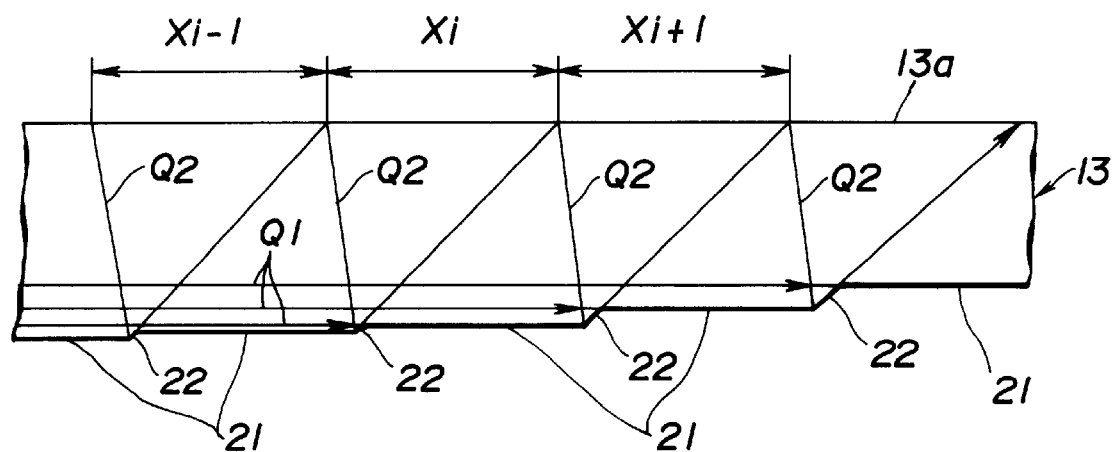
FIG. 4 is an enlarged sectional view of a part of the flat type light transmitting board of FIG. 2.
Figure 6:
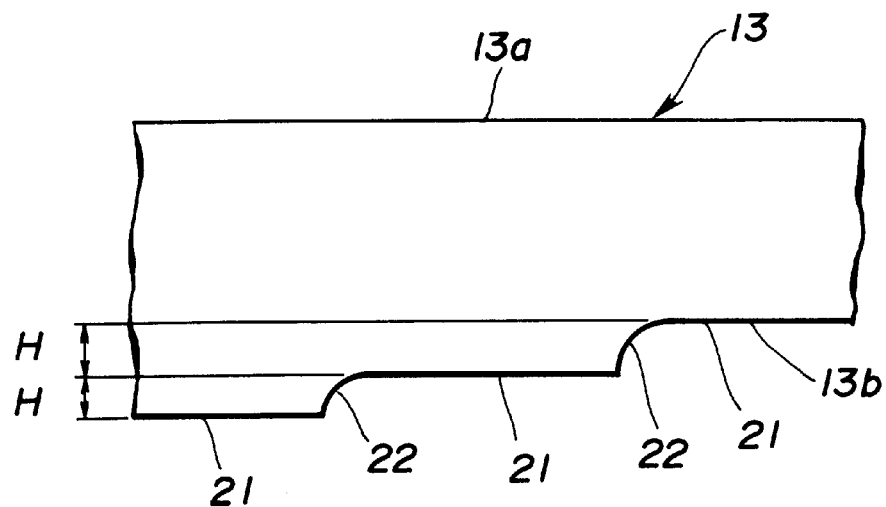
FIG. 6 is a much enlarged sectional view of a part of an annular step portion shown in FIG. 4.

As is seen from FIGS. 1 and 4, a back surface 13b of the circular light transmitting board 13 is formed with a plurality of annular steps 21 which are all concentric with the light entering bore 14. The thickness of these steps 21 gradually reduces with increase of distance from the light entering bore 14. As is seen from FIG. 4, the annular steps 21 are respectively formed with annular light reflecting curved surfaces 22 by which the parallel light beams "Q1" travelling in the board 13 are all reflected toward the front surface 13a of the board 13. Each reflecting curved surface 22 is convex as is understood from FIG. 6.

Figure 8:
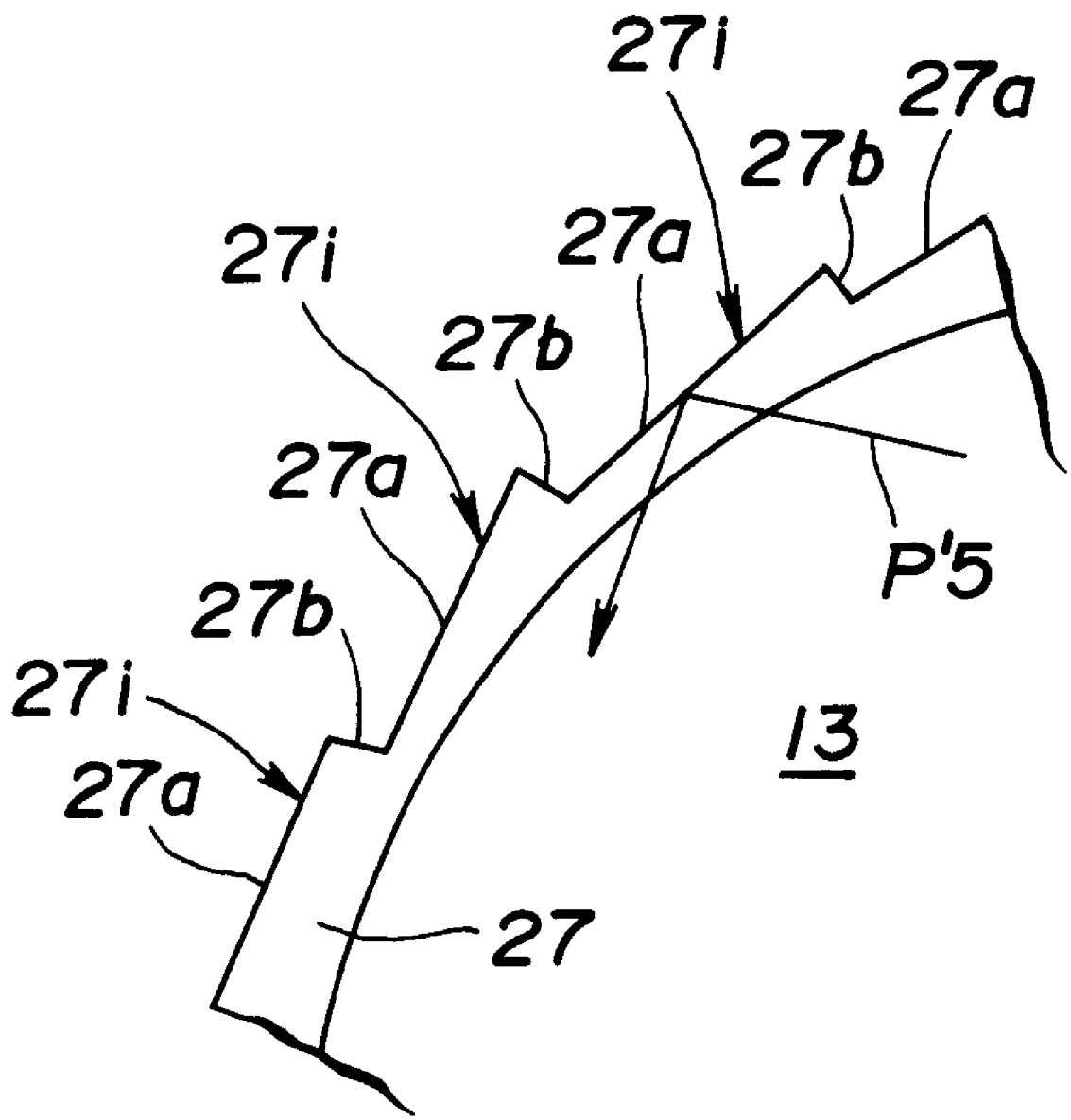
FIG. 8 is a partial enlarged view of a peripheral portion of the flat type light transmitting board.
Figure 10:
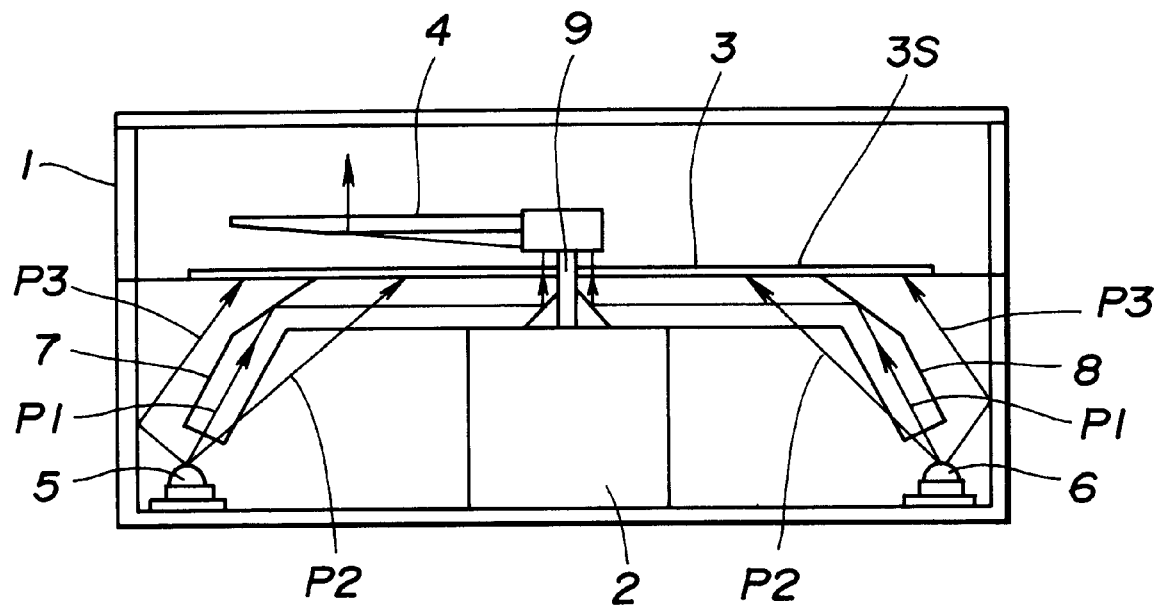
FIG. 10 is a view similar to FIG. 1, but showing a conventional illumination type meter.

For leading light beams to an after-mentioned cut 25, the circular light transmitting board 13 is formed around a periphery thereof with a light reflecting ridge 27 which has a generally V-shaped cross section. If desired, as is seen from FIG. 8, the periphery of the board 13 may have a plurality of light reflecting flat surfaces 27a which are circularly arranged and connected to one another through gaps 27b. That is, each light reflecting surface 27a and a corresponding gap 27b constitute a tapered prism portion 27i which has a V-shaped cross section. These prism portions 27i are circularly arranged in a manner to form rounded steps, as shown. Each prism portion 27i comprises front and rear tapered surfaces formed respectively on the front and rear sides of the board 13. The length of the rear tapered surface is designed to be equal to or smaller than that of the front tapered surface. However, in practice, since the thickness of the light reflecting edge 27 varies at each position of the annular steps 21 formed on the back surface 13b of the board 13 (this is because the shaft passing bore 15 located in the generally center position of the board 13 and the light entering bore 14 located in the center of the annular light reflecting curved surfaces 22 are concentric with each other), the front and rear tapered surfaces are so arranged as to locate the ridgeline of the V-shaped prism portions 27i at a center of the thickness of the light reflecting edge 27. That is, by allowing the front and rear tapered surfaces to have the same size (viz., length), undesired phenomenon wherein light beams are reflected by the tapered surface toward the back side of the board 13 is suppressed or at least minimized. Preferably, the angle defined by the front and rear tapered surfaces is about 90 degrees.

As is seen from FIG. 2, the front surface 13a of the light transmitting board 13 is formed with a Fresnel lens 23 which is concentric with the light entering bore 14. That is, the Fresnel lens 23 on the front surface 13a is concentric with the above-mentioned annular steps 21 on the rear surface 13b of the circular board 13.

Figure 5A:
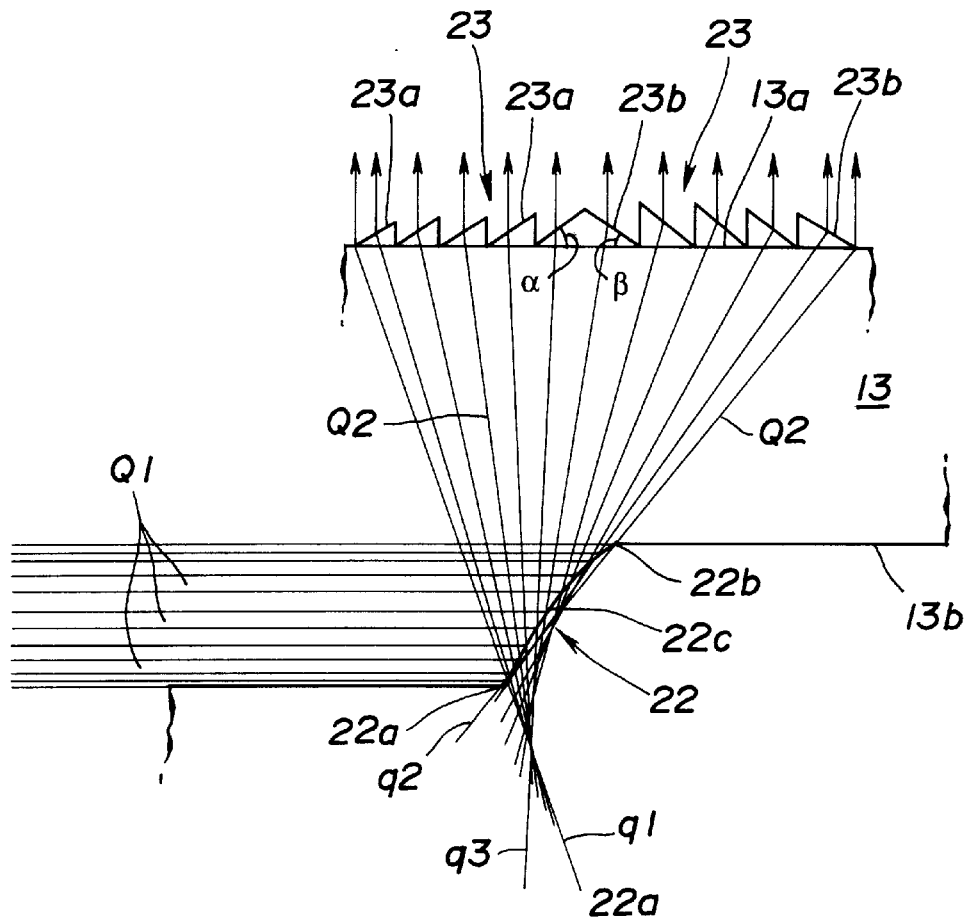
Figure 5B:
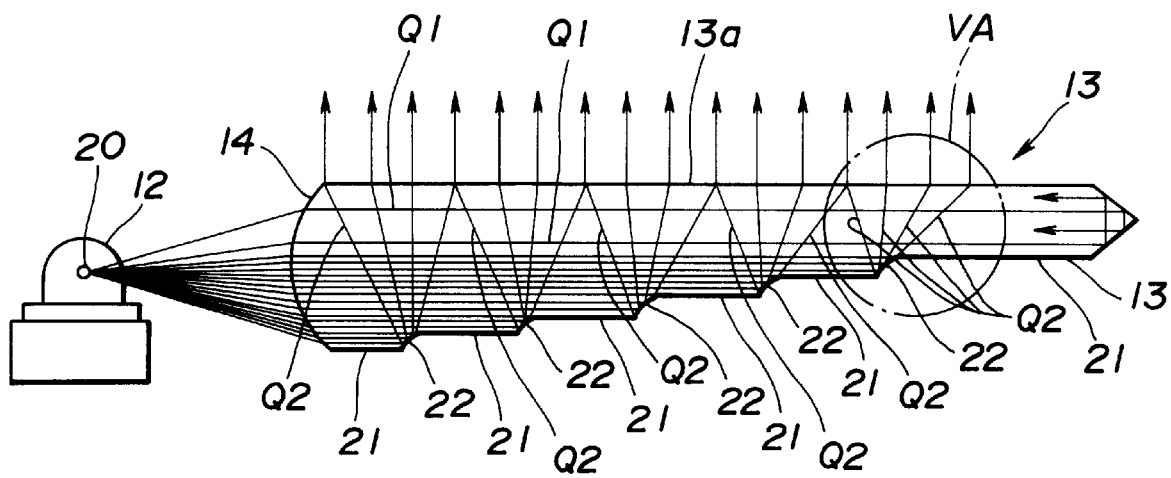

As is seen from FIGS. 5A and 5B, due to provision of the Fresnel lens 23, the light beams "Q2" coming from the light reflecting curved surfaces 22 are projected perpendicular outward from the front surface 13a of the board 13. As is seen from FIG. 5A, the Fresnel lens 23 comprises a first group of annular lens. elements 23a each having a positive reflecting angle "α" and a second group of annular lens elements 23b each having a negative reflecting angle "β". Preferably, the Fresnel lens 23 has about ten annular lens elements 23a and 23b (viz., five elements 23a of the first group and five elements 23b of the second group) for each annular step 21 formed on the back surface 13b of the board 13. With this, as is seen from FIG. 4, respective annular zones Xi−1, Xi, Xi+1, . . . (i:1 to n) of the front surface 13a to which the light beams "Q2" from the light reflecting curved surfaces 22 reach are equally or evenly illuminated. As is seen from FIG. 5A, preferably, the focus of each Fresnel lens 23 may be positioned in a zone where first, second and third imaginary lines "q1", "q2" and "q3" are closely collected, the first imaginary line "q1" being a line which extends in a direction opposite to a direction in which the reflected light beam "q2" from the lowermost end 22a of the light reflecting curved surface 22 travels, the second imaginary line "q2" being a line which extends in a direction opposite to a direction in which the reflected light beam "Q2" from the uppermost end 22b of the light reflecting curved surface 22 travels and the third imaginary line "q3" being a line which extends in a direction opposite to a direction in which the reflected light beam "Q2" from an intermediate part 22c of the light reflecting curved surface 22 travels. As is seen from FIGS. 2 and 5B, the light beams "Q1" entering the circular light transmitting board 13 from the electric bulb 12 travel therein in parallel and in radial directions before reaching the annular light reflecting curved surfaces 22. Since the light flux "P4" diffuses in proportion to the square of distance, the quantity of light in the board 13 reduces gradually with increase of distance from the electric bulb 12. To cope with this phenomenon, in the present invention, the height "H" of the respective light reflecting curved surfaces 22 gradually increases with increase of distance from the electric bulb 12, as is understood from FIG. 6. That is, the area of the respective light reflecting curved surfaces 22 increases with increase of the distance from the electric bulb 12 and thus the front surface 13a of the light transmitting board 13 can evenly receive light beams from the back surface 13b. This means that the dial plate 18 is evenly illuminated from the back.

As is seen from FIGS. 1 and 2, the shaft passing bore 15 of the board 13 is formed with a light reflecting surface (no numeral) by which part of the parallel light beams "Q1" is reflected toward the base portion of the transparent pointer 17 through a shaft passing opening (no numeral) of the dial plate 18. Furthermore, the board 13 has near the shaft passing bore 15 light reflecting grooves 24 by which part of the parallel light beams "Q1" is reflected toward the shaft passing bore 15. The light beams led into the base portion are reflected by the light reflecting surface of the base portion toward the pointer proper and then reflected forward by a slanted back surface of the pointer proper as is indicated by the arrow "Q3" in FIG. 1. Thus, the light beams "P4" from the electric bulb 12 can illuminate the dial plate 18 from back and the pointer 17 from within.

As is seen from FIGS. 2 and 3, the circular light transmitting board 13 is formed at a diametrically opposed portion of the light entering bore 14 with a rectangular cut 25. The cut 25 is not covered with the dial plate 18. Within the cut 25, there is installed a liquid crystal display panel "LCD". Peripheral sides of the cut 25 are slanted to form light reflecting surfaces 26. As is seen from FIG. 3 and 7, due to the light reflecting surfaces 26, the light beams "P'5" travelling in the light transmitting board 13 are reflected rearward, that is, toward another light reflecting surfaces 28 formed on a rearward projection of the board 13. Due to provision of the above-mentioned light reflecting ridge 27 or the prism portions 271, some of the light beams "P5" (see FIG. 2) travelling in the board 13 are reflected toward the light reflecting surfaces 26 of the cut 25.

Figure 7:
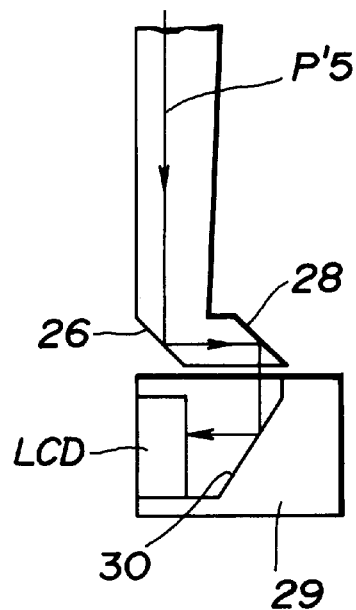
FIG. 7 is an illustration for explaining a light transmitting from the flat type light transmitting board toward the liquid crystal display panel.

As is seen from FIGS. 3 and 7, the liquid crystal display panel "LCD" is held by a transparent holder 29 which has a light reflecting surface 30. The light beams "P'5" from the light reflecting surface 28 are reflected by the light reflecting surface 30 toward a back surface of the liquid crystal display panel "LCD" to illuminate the same.

The paths along which the light beams from the electric bulb 12 travel toward the rectangular cut 25 for the liquid crystal display panel "LCD" are clearly shown in FIGS. 9A, 9B and 9C.

Thus, the light beams from the electric bulb 12 can illuminate the dial plate 18 from back, the pointer 17 from within and the liquid crystal display panel "LCD" from back.

In the following, advantages of the present invention will be described.

First, due to provision of the annular light reflecting curved surfaces 22 and the Fresnel lens 23 on the light transmitting board 13, the dial plate 18 can be evenly illuminated therethroughout from back. This provides a viewer or driver with easy recognition of the graduation and indication marks on the dial plate 18 as well as aesthetic value of the meter.

Second, due to usage of the flat light transmitting board 13, the meter can have a relatively thin structure.

Third, because the expensive ruled half-tone screen is not used, the meter can be produced at a low cost.

What is claimed is:

1. A meter comprising:

a transparent light transmitting board having both a light entering bore and a shaft passing bore formed therethrough;

a translucent dial plate placed on a front surface of said light transmitting board, said dial plate having a shaft passing opening mated with the shaft passing bore of said light transmitting board;

a movement positioned behind said light transmitting board;

a light source positioned within said light entering bore;

a drive shaft extending from said movement to the outside of said dial plate through said shaft passing bore and said shaft passing opening;

a transparent pointer connected to said drive shaft to move over a front surface of said dial plate;

an annular convex peripheral wall defining said light entering bore, said annular convex peripheral wall allowing light beams from said light source to enter the light transmitting board and travel in parallel in the same;

a plurality of stepped annular light reflecting surfaces formed on a rear surface of said light transmitting board and arranged to be concentric with said light entering bore, said annular light reflecting surfaces reflecting the light beams from said annular convex peripheral wall toward the front surface of said light transmitting board; and a Fresnel lens formed on the front surface of said light transmitting board and arranged to be concentric with said light entering bore, said Fresnel lens projecting the light beams from said annular light reflecting surfaces toward the dial plate.

2. A meter as claimed in claim 1, in which said Fresnel lens is arranged to project the light beams form said annular light reflecting surfaces in a direction perpendicular to said front surface of said light transmitting board.

3. A meter as claimed in claim 2, in which said Fresnel lens comprises a first group of annular lens elements each having a positive reflecting angle and a second group of annular lens elements each having a negative reflecting angle.

4. A meter as claimed in claim 3, in which said Fresnel lens has, for each annular light reflecting surface of the rear surface of the light transmitting board, five annular lens elements of first group and five annular lens elements of second group.

5. A meter as claimed in claim 4, in which the focus of the Fresnel lens is positioned in a zone where first, second and third imaginary lines are closely collected, the first imaginary line being a line which extends in a direction opposite to a direction in which a reflected light beam from the lowermost end of the annular light reflecting surface travels, the second imaginary line being a line which extends in a direction opposite to a direction in which a reflected light beam from the uppermost end of the annular light reflecting surface travels and the third imaginary line being a line which extends in a direction opposite to a direction in which a reflected light beam from an intermediate part of the annular light reflecting surface travels.

6. A meter as claimed in claim 1, in which each of said stepped annular light reflecting surfaces is convex in shape.

7. A meter as claimed in claim 1, in which the area of the respective stepped annular reflecting surfaces increases with increase of the distance from the light source.

8. A meter as claimed in claim 1, further comprising:
   a first light reflecting surface defined by a wall of said shaft passing bore to reflect the light breams from said light source toward a base of said transparent pointer;
   a second light reflecting surface defined by the light transmitting board and positioned near the shaft passing bore to reflect the light beams from said light source toward said shaft passing bore;
   a third light reflecting surface defined by said base portion of said transparent pointer to reflect the light beams from said first light reflecting surface toward a pointer proper of said pointer; and
   a fourth light reflecting surface defined by a rear surface of said pointer to reflect the light beams from said third light reflecting surface toward the front of said pointer.

9. A meter as claimed in claim 8, in which said second light reflecting surface is defined by a groove formed in said light transmitting board.

10. A meter as claimed in claim 1, further comprising:
    a rectangular cut formed in said light transmitting board at a position opposite to said light entering bore with respect to said shaft passing bore;
    a transparent holder placed in said rectangular cut;
    an auxiliary display device held by said transparent holder; and
    light reflecting surfaces to guide the light beams from said light source to a back surface of said auxilliary display device through a periphery of said light transmitting board, said rectangular cut and said transparent holder.

11. A meter as claimed in claim 10, in which said light transmitting board is generally circular in shape, and in which the circular light transmitting board is formed around the periphery thereof a light reflecting ridge which has a generally V-shaped cross section.

12. A meter as claimed in claim 10, in which said light transmitting board is generally circular in shape, in which the periphery of the light transmitting board has a plurality of light reflecting flat surfaces which are circularly arranged and connected to one another through gaps.

13. A light transmitting board for use in an illumination type meter, comprising;

a generally flat transparent board;

a light entering bore formed in said transparent board, said light entering bore being defined by an annular convex peripheral wall of said transparent board, said light entering bore being adapted to receive therein a light source for allowing light beams from said light source to enter the transparent board and travel in parallel therein;

a plurality of stepped annular light reflecting surfaces formed on a rear surface of said transparent board and arranged to be concentric with said light entering bore, said annular light reflecting surfaces reflecting the light beams from said light entering bore toward a front surface of the transparent board; and a Fresnel lens formed on the front surface of said transparent board and arranged to be concentric with said light entering bore, said Fresnel lens projecting the light beams from said stepped annular light reflecting surfaces toward the front of said transparent board.

14. A light transmitting board as claimed in claim 13, in which said Fresnel lens is arranged to project the light beams from said stepped annular light reflecting surfaces in a direction perpendicular to said front surface of said transparent board.

15. A light transmitting board as claimed in claim 14, in which said Fresnel lens comprises a first group of annular lens elements each having a positive reflecting angle and a second group of annular lens elements each having a negative reflecting angle.

16. A light transmitting board as claimed in claim 15, in which said Fresnel lens has, for each annular light reflecting surface of the rear surface of the transparent board, five annular lens elements of the first group and five annular lens elements of the second group.

17. A light transmitting board as claimed in claim 16, in which the focus of the Fresnel lens is positioned in a zone where first, second and third imaginary lines are closely collected, the first imaginary line being a line which extends in a direction opposite to a direction in which a reflected light beam from the lowermost end of the annular light reflecting surface travels, the second imaginary line being a line which extends in a direction opposite to a direction in which a reflected light beam from the uppermost end of the annular light reflecting surface travels and the third imaginary line being a line which extends in a direction opposite to a direction in which a reflected light beam from an intermediate part of the annular light reflecting surface travels.

18. A light transmitting board as claimed in claim 13, in which the area of the respective stepped annular reflecting surfaces increases with increase of the distance from the light source.

* * * * *